United States Patent
Rieth

(10) Patent No.: US 11,974,597 B2
(45) Date of Patent: *May 7, 2024

(54) FILTER ELEMENT FOR TOBACCO ARTICLES, THE FILTER ELEMENT HAVING A CAPSULE WITH A LIQUID MEDIUM AS ITS CORE MATERIAL

(71) Applicant: REEMTSMA CIGARETTENFABRIKEN GMBH, Hamburg (DE)

(72) Inventor: Fabian Rieth, Hamburg (DE)

(73) Assignee: Reemtsma Cigarettenfabriken GMBH, Hamburg (DE)

( * ) Notice: Subject to any disclaimer, the term of this patent is extended or adjusted under 35 U.S.C. 154(b) by 662 days.

This patent is subject to a terminal disclaimer.

(21) Appl. No.: 16/631,090

(22) PCT Filed: Jul. 17, 2018

(86) PCT No.: PCT/EP2018/069428
§ 371 (c)(1),
(2) Date: Jan. 14, 2020

(87) PCT Pub. No.: WO2019/016226
PCT Pub. Date: Jan. 24, 2019

(65) Prior Publication Data
US 2020/0146341 A1 May 14, 2020

(30) Foreign Application Priority Data
Jul. 21, 2017 (EP) .................................. 17182591

(51) Int. Cl.
*A24D 3/06* (2006.01)
*A24D 3/02* (2006.01)
(Continued)

(52) U.S. Cl.
CPC ............... *A24D 3/061* (2013.01); *A24D 3/02* (2013.01); *A24D 3/067* (2013.01); *C08L 33/08* (2013.01); *C08L 33/10* (2013.01)

(58) Field of Classification Search
CPC .... A24D 3/00; A24D 3/06–061; A24D 3/062; A24D 3/02; A24D 3/0212;
(Continued)

(56) References Cited

U.S. PATENT DOCUMENTS 3,390,686 A * 7/1968 Irby, Jr. .................. A24D 3/061
131/337
2004/0261807 A1 12/2004 Dube et al.
(Continued)

FOREIGN PATENT DOCUMENTS

EP 2997837 A1 3/2016
WO 2006136197 A1 12/2006
(Continued)

OTHER PUBLICATIONS

International Search Report from PCT/EP2018/069428 dated Oct. 15, 2018, 2 pages.
(Continued)

*Primary Examiner* — Philip Y Louie
*Assistant Examiner* — Yana B Krinker
(74) *Attorney, Agent, or Firm* — Workman Nydegger

(57) ABSTRACT

The present invention relates to a filter element for use in a tobacco article, the filter element having at least one filter body and at least one capsule with a liquid medium as core material, characterized in that the at least one capsule has a water vapor-impermeable shell of a polymeric material which was obtained from a UV-polymerizable precursor material, wherein the UV-polymerizable precursor material is at least one compound with two in each case terminal diacrylate and/or dimethacrylate groups which are linked by a rigid, non-polar, non-crosslinking group.

24 Claims, 4 Drawing Sheets

(51) Int. Cl.
*C08L 33/08* (2006.01)
*C08L 33/10* (2006.01)

(58) Field of Classification Search
CPC ........ A24D 3/0216; A24D 3/022; A24D 3/14; A24D 3/067; A24D 3/08
USPC ..... 131/331, 332, 335, 337, 341; 493/39, 50
See application file for complete search history.

(56) References Cited

U.S. PATENT DOCUMENTS

| | | | | |
|---|---|---|---|---|
| 2007/0012327 | A1* | 1/2007 | Karles | A24D 3/061 131/202 |
| 2012/0128978 | A1* | 5/2012 | Ballweg | B01J 13/04 428/394 |
| 2014/0303273 | A1* | 10/2014 | Noirot | C09D 11/102 522/9 |
| 2014/0338134 | A1* | 11/2014 | Fernandez Prieto | C11D 17/0039 510/276 |
| 2015/0296874 | A1* | 10/2015 | Awty | A24B 13/00 493/47 |

FOREIGN PATENT DOCUMENTS

| | | |
|---|---|---|
| WO | 2007083245 A2 | 7/2007 |
| WO | 2008146169 A2 | 12/2008 |

OTHER PUBLICATIONS

"Eudragit" Evonik Industries, Dec. 1, 2015, retrieved from http://eudragit.evonik.com/sites/lists/HN/Documents/evonik-brochure-eudragit-EN.pdf, 16 pages.

Extended European Search Report for EP 17182591.2 dated Feb. 6, 2018, 6 pages.

* cited by examiner

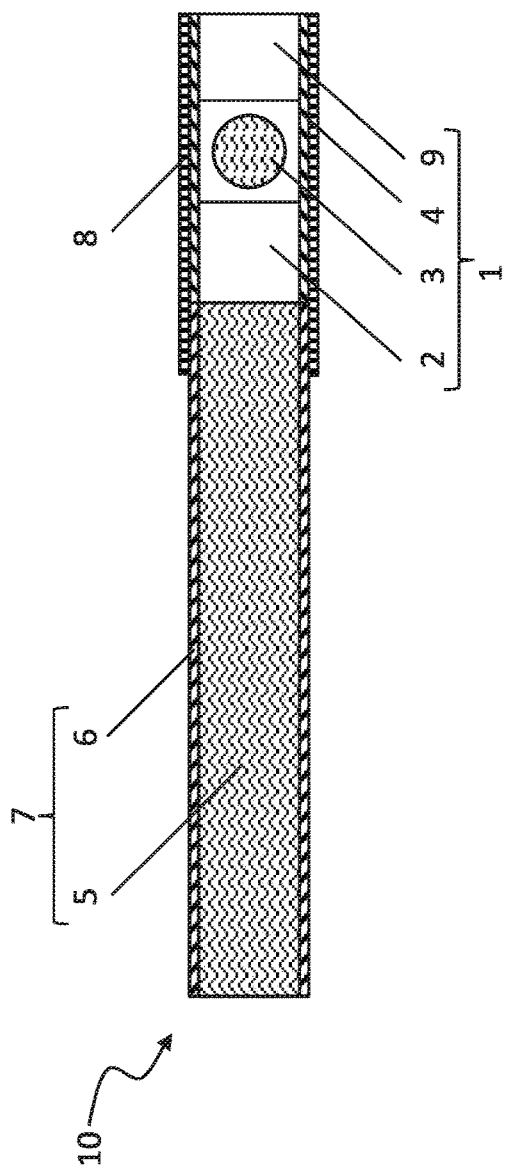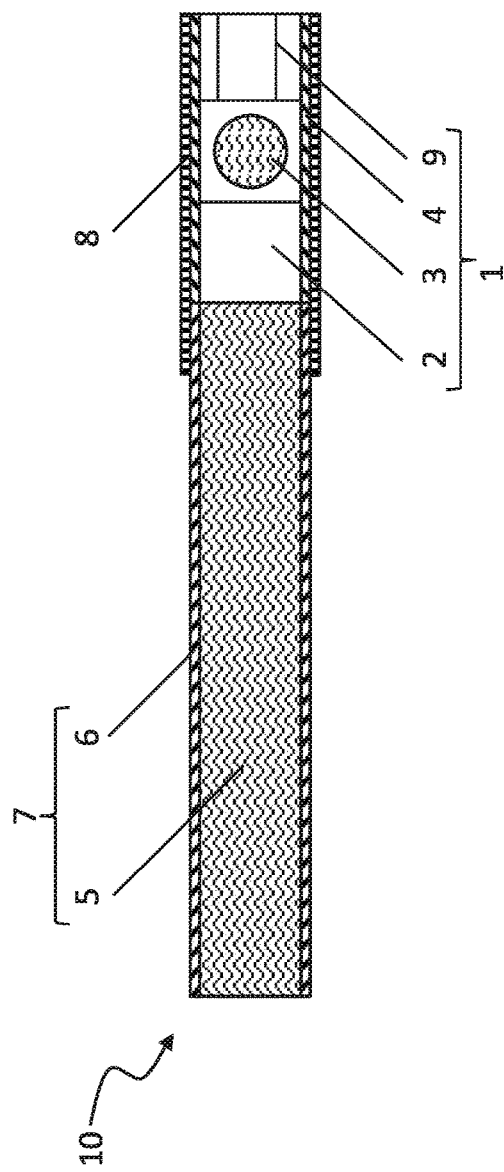

FILTER ELEMENT FOR TOBACCO ARTICLES, THE FILTER ELEMENT HAVING A CAPSULE WITH A LIQUID MEDIUM AS ITS CORE MATERIAL

Tobacco articles, such as for example cigarettes, with a filter element which contains a breakable capsule are known in the prior art. US 2004/0261807 and WO 2006/0136197, for example, describe exemplary embodiments of such tobacco articles and filter elements. The substances present in the capsules generally serve to aromatize or influence the inhalate prior to intake by the consumer or to influence resistance to draw (RTD). In addition to enriching the gas stream to be inhaled with aroma or flavor substances, the intention may additionally be to bind or remove accompanying or harmful substances from the gas stream to be inhaled. The contents of the capsules are here preferably not released until shortly before use of the tobacco article by the capsule being broken apart in the filter element. One object of the capsules used is thus to protect the contents from undesired escape and only to release them by breakage of the capsule. One challenge facing hitherto known capsules is thus the storage life of capsules or tobacco articles containing such capsules, in particular the storage life of capsules which contain hydrophilic media, such as for example aqueous solutions.

The present invention relates to a filter element for use in a tobacco article according to any one of the claims, and to a tobacco article containing such a filter element.

For the purposes of the present invention, the term filter element comprises an arrangement which is suitable for removing one or more constituents from an aerosol or gas stream to be inhaled or influencing the concentration thereof, in particular for reducing the concentration thereof in the gas stream to be inhaled, or for influencing resistance to draw (RTD) on inhalation of the aerosol. To this end, the filter element has at least one filter body which is arranged such that the at least one filter body can exert a filter action. The filter body is generally arranged in such a manner in the filter element that the filter body exerts a filter action on the gas stream to be inhaled, wherein the gas stream to be inhaled generally proceeds from a tobacco-containing element through the filter element to the consumer.

The filter element according to the invention comprises at least one filter body and at least one capsule with a liquid medium as core material. The at least one filter body and the at least one capsule are preferably surrounded by a shell material. The shell generally serves to keep the individual constituents in the desired arrangement relative to one another and to ensure subsequent connection to further components of a tobacco article. The shell material used is preferably paper or paper-containing material or paperboard or paperboard-containing material. The shell material may be used in a form which is entirely or partially uncoated or entirely or partially coated with one or more substances or active ingredients. The shell material may be provided with one or more holes ("ventilation holes") which allow the gas stream to be inhaled to be influenced by the filter element.

The filter bodies used in the filter element according to the invention are not restricted to particular types and any filter bodies which are conventionally used and employed in the field of tobacco articles may be used. Suitable filter bodies are known to a person skilled in the art. Filter bodies are conventionally produced from fibrous material, for example from acetate-based materials such as cellulose acetates, for example cellulose monoacetate. The fibrous material of the filter body may be partially or entirely uncoated or coated or modified with one or more substances and/or active ingredients.

The filter element according to the invention may have two or more filter bodies, wherein the at least one capsule may be present embedded in one of the filter bodies or be arranged in the axial direction of flow through the filter element next to (thus before or after) the at least one filter body or between two adjacent filter bodies.

One or more filter bodies of the filter element according to the invention may have one or more hollow recesses or "hollow bores". These hollow recesses are preferably oriented in the axial direction of flow of the gas stream to be inhaled though the filter element, such that, on average over the entire cross-section, the resistance to draw of the filter body is reduced.

The filter element according to the invention may for example have a recess (i.e. take the form of a "recess filter") at the end which is intended subsequently to form the mouth end of filter of a tobacco article. This terminal recess may be provided in a terminal filter body or in another terminal component of the filter element according to the invention.

In addition to filter bodies and capsules, the filter element according to the invention may include still further elements or components, such as for example cavities which are for example formed and stabilized by tubes (e.g. of paperboard or the like), or further mechanical ventilation or filter elements as well as further cavities or ingredients.

The filter element according to the invention may also comprise two or more capsules, wherein each capsule may preferably separately either be present embedded in a filter body or be arranged before, after or between the filter bodies of the filter element, wherein a plurality capsules may also be present embedded in one or more filter bodies or be arranged before, after or between the filter bodies of the filter element.

The filter element according to the invention is suitable for use in a tobacco article. According to the invention, a tobacco article is taken to be an arrangement which has a tobacco-containing region, wherein the consumer generally inhales an aerosol from the tobacco-containing region. In addition to a filter element according to the invention, the tobacco article according to the invention preferably has a tobacco-containing, rod-shaped element which is present connected to the filter element in such a manner that an aerosol or gas stream to be inhaled can be passed from the tobacco-containing, rod-shaped element through the filter element according to the invention to the consumer. A person skilled in the art is aware of suitable tobacco articles, such as for example cigarettes or tobacco-containing articles for consumption in a "heat-not-burn" (HnB) device in which the tobacco-containing material is not combusted but instead heated to a temperature which does not exceed 350° C. to form an aerosol which the consumer may then inhale. Suitable tobacco articles and HnB devices are known to a person skilled in the art.

The invention in particular relates to a filter element for use in a tobacco article, the filter element having at least one filter body and at least one capsule with a liquid medium as core material, characterized in that the at least one capsule has a water vapor-impermeable shell of a polymeric material which was obtained from a UV-polymerizable precursor material, wherein the UV-polymerizable precursor material is at least one compound with two in each case terminal diacrylate and/or dimethacrylate groups which are linked by a rigid, non-polar, non-crosslinking group, wherein the capsules have an average particle size of 0.1 to 10 mm, preferably of 1 to 5 mm, and an average wall thickness of 10 μm to 2 mm, preferably of 50 μm to 200 μm.

In the filter element according to the invention, the at least one capsule preferably has a WVTR (water vapor transmission rate; measured at 23° C. and a relative humidity of 80%) of 0.005 to 50 g/m²d, in particular of 0.1 to 10 g/m²d.

In particular, the filter element according to the invention may be configured such that the liquid medium of the core material is releasable by mechanical loading.

In the filter element according to the invention, the rigid group of the UV-polymerizable precursor material may comprise or be derived from at least one compound which is selected from the group consisting of:

a. aliphatic bicyclic or tricyclic ring diol systems which may be substituted by alkyl groups with 1 to 3 carbon atoms,
b. bisphenol A or derivatives thereof in which one or both phenyl residues are substituted by alkyl groups with 1 to 3 carbon atoms, and
c. diurethanes which are formed from a branched $C_5$ to $C_{10}$ alkyl diisocyanate or $C_5$ to $C_{10}$ cycloalkyl diisocyanate and monoethylene glycol.

The UV-polymerizable precursor material is particularly preferably selected from bisphenol A diacrylate, bisphenol A dimethacrylate, tricyclodecanedimethanol diacrylate, tricyclodecanedimethanol dimethacrylate and/or urethane dimethacrylate (UDMA) of the following formula, this generally being an isomer mixture:

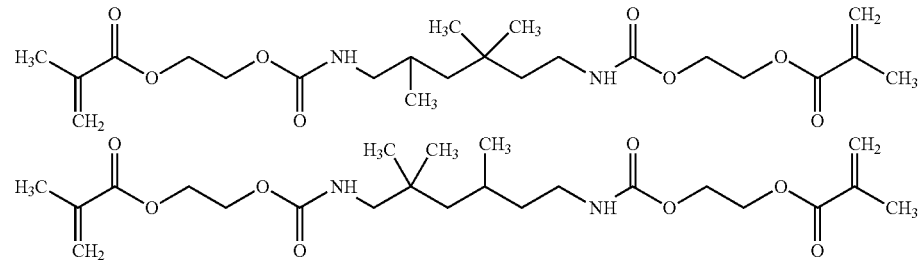

A UV-polymerizable precursor material which is preferably used in the filter element according to the invention is one which has a viscosity amounting to 0.001 to 50 Pa·s, particularly preferably 0.1 to 10 Pa·s.

The UV-polymerizable precursor material used in the filter element according to the invention may in particular be distinguished in that it contains no solvent and no substances which are readily volatile at room temperature and atmospheric pressure.

The liquid medium as the core material of the at least one capsule may for example be a hydrophilic liquid medium, preferably an aqueous solution or dispersion and very particularly preferably water.

In particular, a capsule which may be used in the filter element according to the invention is one which can be produced by a method having the steps of:
  co-extruding the core material and a composition which contains a UV-polymerizable precursor material of the shell and a free-radical initiator in such a manner that the UV-polymerizable precursor material surrounds droplets of the water-containing core material in order to obtain a co-extruded material, and
  subsequently passing the co-extruded material through a curing zone which is a region filled with air, another gas, or in particular inert gas, in which polymerization and crosslinking of the precursor material of the shell is brought about by actinic radiation and the residence time of the co-extruded material in said curing zone amounts to 0.02 to 0.2 seconds,
  wherein the UV-polymerizable precursor material is at least one compound with two in each case terminal diacrylate groups and/or dimethacrylate groups which are linked by a rigid group, and
  wherein the core material contains an agent for achieving interfacial compatibility between the core material and the shell.

In the method for producing the capsules of the filter element according to the invention, the residence time of the co-extruded material in the curing zone preferably amounts to 0.05 to 0.1 seconds.

In the method for producing the capsules of the filter element according to the invention, the intensity of the actinic radiation may be such that the residual monomer content of the introduced monomers after curing is 15 wt. % or less, preferably 2 to 10 wt. % and still more preferably 1 to 5 wt. %.

Post-curing induced by actinic radiation may optionally be performed in the method for producing the capsules of the filter element according to the invention.

In a preferred variant of the method for producing the capsules of the filter element according to the invention, the interfacially active agent is preferably selected from non-ionic surfactants and polyalkylene oxides, in particular polyethylene oxides with a molar mass of 100,000 to 3,000,000 dalton, and combinations thereof.

The liquid medium of the core material of the at least one capsule of the filter element according to the invention may contain for example salts, salt hydrates, carbohydrates, proteins, vitamins, amino acids, nucleic acids, lipids, medicines, thickeners, emulsifiers, surfactants, colorants, cell material, aroma substances, fragrances or other active ingredients.

In addition to the water vapor-impermeable shell, the at least one capsule of the filter element according to the invention may have one or more further coatings on the outside, with the coating preferably being applied by means of vacuum processes such as sputtering, vapor deposition or plasma processes, or by means of chemical or electrodeposition coating, in order to obtain coated capsules.

In the filter element according to the invention, the at least one capsule may be present embedded in the at least one filter element. The capsule may, however, also be arranged next to the at least one filter body, for example before or after the at least one filter body in the axial direction of the filter element.

The filter element according to the invention may have more than one filter body. If this is the case, the at least one capsule may preferably be arranged between two adjacent filter bodies.

In a preferred embodiment, the filter element according to the invention has at least one filter body which has one or more hollow recesses in the longitudinal direction.

In order to allow the at least one capsule of the filter element according to the invention to be broken apart from the outside, for example by squeezing the filter element, it is advantageous for the at least one capsule to have a compressive strength in the range from 5 N to 25 N.

The at least one filter body and the at least one capsule may be arranged in the filter element according to the invention in any conceivable orientation relative to one another which is convenient for use of the filter element in a tobacco article. The at least one filter body and the at least one capsule are preferably surrounded by a shell material, the shell material preferably being paper or paperboard.

The present invention also relates to a tobacco article containing a tobacco-containing, rod-shaped element and a filter element according to the invention which is arranged in the axial direction to the tobacco-containing, rod-shaped element.

The solution presented with the present invention involves the use of capsules with a water vapor-impermeable shell of a polymeric material which has been obtained from a UV-polymerizable precursor material and an aqueous core material. The capsules enable easy release of the aqueous core material by mechanical action/loading, for example by exposure to pressure and/or shear stress.

It has here proven possible to produce spherical capsules filled with water, aqueous solutions, suspensions or emulsions in the millimeter and sub-millimeter range with thin acrylate shells, which even when stored under ambient conditions or indeed under particularly dry air conditions have long retention times (over months and years) with regard to water and water vapor and do not dry out. The high quality of the shells with their good basic barrier properties furthermore makes it possible to further upgrade the capsules even into the high barrier range, for example by vacuum processes.

This is achieved by a method for producing capsules with a water-containing core material and a water vapor-impermeable polymerized shell having the steps of:
  co-extrusion of the core material and a composition which contains a UV-polymerizable precursor material of the shell and a free-radical initiator in such a manner that the UV-polymerizable precursor material surrounds droplets of the water-containing core material in order to obtain a co-extruded material, and
  subsequently passing the co-extruded material through a curing zone which is a gas-filled region, for example a region filled with air or with inert gas, in which polymerization and crosslinking of the precursor material of the shell is brought about by actinic radiation and the residence time of the co-extruded material in said curing zone amounts to 0.02 to 0.2 seconds,
  wherein the UV-polymerizable precursor material is at least one compound with two in each case terminal diacrylate groups and/or dimethacrylate groups which are linked by a short, rigid group, and
  wherein the core material contains an agent for achieving interfacial compatibility between the core material and the shell.

The capsules are accordingly produced by means of a technological method which combines microextrusion, selection of specific precursor materials, generally vibration-induced droplet generation and UV curing with one another. It was in particular surprising that capsules with particularly good barrier properties are obtained by specific diacrylates and methacrylates and not with more highly functional building blocks (tri/tetraacrylates or oligomers) which in principle permit a higher crosslink density and thus actually appear to be more suitable.

Co-extrusion proceeds for example by means of a concentric combination of nozzles with a core nozzle and annular nozzle which permit maximally parallel flow of the shell precursor material and of the core material such that the crosslinkable precursor material is extruded as an outer (e.g. annular) jacket around the contents, the core material is enclosed by the precursor material and droplets enveloped by outer material are formed. This ensures a clean separation of core (water) and shell materials with negligible contamination and controllably adjustable shell thickness with tight tolerances for the purposes of maximum encapsulation efficiency. The co-extrusion step preferably proceeds in air or generally a gas, in particular an inert gas. Immediately or shortly after the extrusion step and preferably in the relatively close spatial vicinity of the extrusion device, the particles are passed, preferably with the assistance of gravity, through a zone in which the precursor material is polymerized and crosslinked by actinic radiation. The distance between the extrusion device and the radiation zone should preferably be selected that it is just sufficient for the droplets to be pinched off and rounded. Depending on the velocity at which the materials emerge from the nozzle, the associated optimum pinching off frequency and the resultant production rate, this distance preferably amounts to at least 15 cm and at most 150 cm and typically to approx. 20 to 50 cm. As the distance between nozzles and radiator increases, the velocity of the capsules rises a result of acceleration due to gravity, such that, at a still greater distance, the residence time in the radiation may no longer be sufficient for curing.

The resultant crosslinking product serves as a capsule enclosing the content or core material which fills these structures. The co-extrusion process used to form capsules is known per se and described, for example, in Chemie Ingenieur Technik 2003, 75, no. 11, pages 1741-1745, but without the UV curing used in the present invention for encapsulating aqueous contents. Corresponding equipment for co-extruding and forming microcapsules which is suitable according to the invention is distributed, for example, by Brace GmbH.

The capsules used in the filter element according to the invention are in particular distinguished in that the UV-polymerizable precursor material used for the shell is at least one compound with two in each case terminal diacrylate groups and/or dimethacrylate groups which are linked by a rigid group (hereinafter also denoted "linking group"). A person skilled in the art will take these to include groups which have slight lateral and rotational mobility due to steric circumstances and/or stabilizing hydrogen bridges.

The term "(meth)acrylate", and terms derived therefrom, as used in the present document comprise methacrylates, acrylates or mixtures of the two, or should be understood accordingly.

The mobility of a polymer chain formed from the precursor material is limited by the selection of a suitable linking group. The rigidity or chain stiffness of the linking group is determined by the three-dimensional structure of the linking group and the chemical nature of the bonds occurring therein. Since the shell material serves as a water or water vapor barrier, a non-polar linking group should preferably be selected. Crosslinking and polymerization substantially proceeds via the terminal (meth)acrylate groups. The linking group should preferably not or not substantially contribute to crosslinking and therefore preferably contains no double bonds. Moreover, double bonds may be cleaved during UV curing and for this reason too should therefore preferably be avoided according to the invention in the linking group.

The linking groups are groups which originate or are derived from compounds with terminal OH groups (diols, bisphenols). "Originate from" or "derived from" are intended to mean that, in the precursor material, the hydrogen atoms on the terminal OH groups of these compounds are replaced by the acrylate or methacrylate residues.

The rigid group (linking group) preferably originates or is derived from at least one compound which is selected from the group consisting of:
 a. aliphatic bicyclic or tricyclic ring diol systems which may be substituted by alkyl groups with 1 to 3 carbon atoms,
 b. bisphenol A or derivatives thereof in which one or both phenyl residues are substituted by alkyl groups with 1 to 3 carbon atoms, and
 c. diurethanes which are formed from a branched $C_5$ to $C_{10}$ alkyl diisocyanate or $C_5$ to $C_{10}$ cycloalkyl diisocyanate and monoethylene glycol, wherein the molar ratio preferably ranges from approx. 1:1.5 to approx. 1:3 (alkyl diisocyanate:ethylene glycol).

The compounds stated in a. are particularly preferred and may be derived from diols of bicyclic compounds such as bicycloheptanes (e.g. bicyclo[3.2.0]heptane), bicyclooctanes (e.g. bicyclo[2.2.2]octane), bicyclononanes (e.g. bicyclo[3.3.1]nonane or bicyclo[4.3.0]nonane), bicyclodecanes (e.g. bicyclo[4.4.0]decane), bicycloundecanes (e.g. bicyclo[3.3.3]undecane), and the like or from bridged bicyclic compounds (i.e. tricyclic compounds), such as for example diols of tricyclodecanedimethane.

The compounds stated in a. may be unsubstituted or be substituted with alkyl groups in each case with 1 to 3 carbon atoms. Methyl groups may be considered as preferred substituents. The number of optional alkyl substituents preferably amounts to 1 to 5, more preferably to 2 to 4. In further preferred embodiments, no further substituents are present.

Specific and particularly preferred examples of precursor materials corresponding to compounds of category a. which may be mentioned are tricyclodecanedimethanol diacrylate (TCDDA, more precisely tricyclo[5.2.1.0]decanedimethanol diacrylate) and tricyclodecanedimethanol dimethacrylate (TCDMDA, more precisely tricyclo[5.2.1.0]decanedimethanol dimethacrylate), wherein tricyclodecanedimethanol diacrylate (TCDDA) is very particularly preferred.

The compounds stated in b. are in particular derived from bisphenol A (2,2-bis(4-hydroxyphenyl)propane) or from derivatives of bisphenol A in which one or both phenyl residues are substituted by alkyl groups with 1 to 3 carbon atoms. Methyl groups may be considered as preferred substituents. The total number of optional alkyl substituents on the phenyl residues preferably amounts to 1 to 4, more preferably to 2 to 3.

In further preferred embodiments, no substituents are present on the aromatic rings, i.e. the compound is bisphenol A. Examples of alkyl-substituted derivatives are bisphenol C (4,4'-(1-methylethylidene)bis[2-methylphenol]) or bisphenol G (4,4'-(1-methylethylidene)bis[2-(1-methylethyl)phenol]).

Specific and particularly preferred examples of precursor materials corresponding to compounds of category b. which may be mentioned are bisphenol A diacrylate and bisphenol A dimethacrylate.

The compounds stated in c. are preferably derived from diurethanes which are formed from a branched $C_5$ to $C_{10}$ alkyl diisocyanate or $C_5$ to $C_{10}$ cycloalkyl diisocyanate and monoethylene glycol. The molar ratio here preferably ranges from approx. 1:1.5 to approx. 1:3 (alkyl diisocyanate:monoethylene glycol), more preferably approx. 1:2.

These compounds are compounds with two terminal monoethylene glycol groups which are in each case linked via a urethane group with a central, branched alkylene group. The branched alkylene group preferably comprises 5 to 10 carbon atoms, more preferably 6 to 9 carbon atoms. The main chain of the branched alkylene group preferably comprises 4 to 7, more preferably 5 or 6 carbon atoms. Methyl groups are in particular preferred as the branching group. The branched alkylene group is particularly preferably a 2-methyl-4,4-dimethylhexylene group. Cycloalkyl groups which are also suitable according to the invention are those in which the cycles have preferably 5 to 6, in particular 6, ring carbon atoms and may furthermore be substituted by alkyl groups, in particular methyl groups.

Specific and particularly preferred examples of precursor materials corresponding to compounds of the category c. which may be mentioned are urethane dimethacrylate (UDMA) of the following formula, this generally being an isomer mixture, or the corresponding

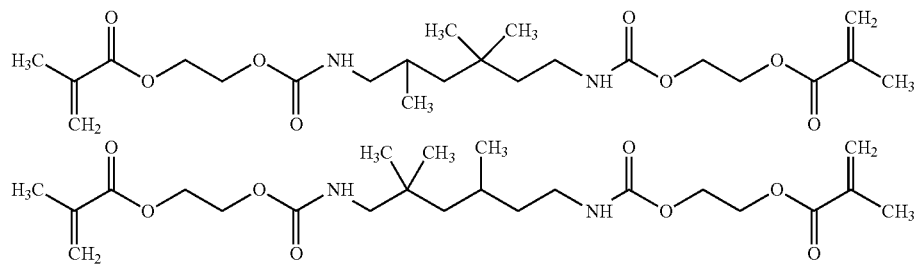

urethane diacrylate:

This is commercially obtainable under the name UDMA (HEMATMDI) for example from Evonik and has a viscosity of 0.33 Pa·s (60° C.) (manufacturer's details).

As has already been mentioned, the core material and the precursor material of the shell are co-extruded such that the precursor material surrounds the core material. This is achieved with the assistance of a combination of nozzles with a generally annular nozzle and a central, generally concentric, inner nozzle. The resultant co-extruded material is then solidified by actinic radiation. The achievable shapes may transition into one another, i.e. depending on method control it is possible to produce substantially spherical capsules or somewhat droplet- or egg-shaped capsules. One particular advantage, however, is that it is possible according to the invention to obtain capsules with a high level of sphericity and a maximally monomodal size distribution. With regard to a maximally monomodal size distribution, $d_{max}/d_{min}$ values of less than 1.1, less than 1.05 or also in the range from 1.01 or below are achievable, wherein $d_{max}$ and $d_{min}$ is the diameter of individual particles from a set of for example 20 or 50 particles.

The capsules produced using the method or the capsules of the present invention are "microcapsules" and are within an average particle size range of preferably 0.1 to 10 mm, preferably 0.2 to 8, more preferably 0.3 to 5 mm and very particularly preferably in the range of 1 to 5 mm. The resultant portioning of the core material is advantageous for many applications since large quantities may be applied while simultaneously ensuring good intermixing. The average particle size may for example be determined by means of a vernier caliper, wherein the diameter of 20 or more, for example 50 or 100 particles, is determined and the average then calculated. In the case of smaller particle sizes, particle size determination may also be performed by means of light or scanning electron microscopy, again by averaging 20 or more, for example 50 or 100 particles. In the case of a high level of sphericity and a monomodal particle size distribution, 20 particles are generally sufficient for determining the average diameter. In general, the intention is to obtain ideally spherical particles, but oval particle shapes are also included. In the case of oval, elongate particle shapes the particle diameter of each individual particle may firstly be determined by measuring the long and short diameters and using the average thereof as the particle diameter. These particle diameters are then used for calculating the average particle diameter in the same manner as in the case of round particles.

Using the presented method, it is possible to produce capsules which, in comparison with the capsule size, have a thin wall thickness. In general the correspondingly produced capsules have an average wall thickness of 10 μm to 2 mm, preferably of 50 μm to 200 μm. A capsule wall thickness in the range from 50 to 200 μm offers an ideal compromise between capsule efficiency and strength, while 10 μm to 2 mm can also be obtained in an extended range.

Wall thickness is adjusted by adjusting the ratio of the material flows of the core and shell materials. To this end, a material flow ratio of core to shell material of for example 5:1 wt./wt. is predetermined at the beginning of a production run. At a defined external diameter of the capsule of for example 4 mm, which is adjusted by selection of nozzle geometry, the wall thickness is defined thereby while also taking account of the density of the core and shell materials. The average wall thickness of a batch of capsules is checked by firstly weighing a representative set of approx. 20 core material-filled capsules of a defined size, and then crushing, drying and reweighing them. The average wall thickness is calculated from the density of the core and shell materials at a defined external diameter. By way of example, the shell thickness, uniformity and absence of defects of individual capsules from the production run are also checked with the assistance of light and scanning electron micrographs of the shell surface and breakage edges.

The compressive strength arising from the dimensions (uniaxial loading; breaking force) can be adjusted in the range from 0.1 N to 200 N by variable adjustment of capsule diameter and shell thickness depending on the intended application. This corresponds to the categories from eggshell morphology to (manually) virtually indestructible. A compressive strength in the range from approx. 5 N to 25 N is particularly advantageous for capsules in which the capsule content is released by crushing the shells between the fingers. Uniaxial compressive strength is here determined using a Zwick universal testing machine on the basis of representative random sample sizes of 20 capsules. The capsules are here crushed between two planar stainless steel test punches with a speed of advance of 3 mm/min until complete failure (breakage). Data is acquired with a 100 N load cell and evaluated using testXpert® software.

Capsule wall thickness is a variable which is of significance not only for compressive strength but also for water vapor transmission rate. A reduction in wall thickness reduces compressive strength and thus the force required for release, while however on the other hand increasing the water vapor transmission rate. Depending on the field of use, a compromise may be found and the properties balanced.

As already mentioned, the capsules can be produced in a monomodal, uniform size with a very small tolerance range. This is advantageous for achieving a uniform wall thickness and prevents thickness falling below a minimum value as a prerequisite for barrier applications and further processing by vacuum processes.

In the stated method, the rheological behavior of the precursor material may be adjusted such that it favors pinching off and the formation of maximally spherical capsules and promotes uniform flow on the core material. At the processing temperature, i.e. on extrusion, the viscosity of the UV-polymerizable precursor material preferably amounts to 0.001 to 50 Pa·s, more preferably 0.01 to 10 Pa·s and still more preferably 0.1 to 1 Pa·s. The viscosity values thus relate to the particular temperature of the precursor material used during extrusion. Viscosity is measured with an MCR 102 Paar rheometer operating by the cone and plate principle with cone dimensions of 60 mm/4° and a measuring gap of 150 µm. A suitable process temperature may be estimated by carrying out standard measurements in the rotational speed range from 0.1 to 100 l/s at 20, 40 and 60° C. The particular desired viscosities may be controlled or readjusted by means of the temperature at which encapsulation proceeds.

Furthermore, higher viscosity precursor materials which cannot be processed alone (or cannot be processed at a given temperature) may also be processed by being blended with low-viscosity components, for example the tri-, tetra- or more highly functional acrylates described further below.

With regard to the water or water vapor impermeability of the capsules, the aim must be to obtain a maximally defect-free capsule shell. In order to achieve this, it is particularly favorable for the precursor material to contain no organic solvents or other volatile constituents since these might escape during the production process or storage and so damage the shell. Mixed systems (technical grade) with impurities and low vapor pressure fractions favor shell defects by bubble formation and are less suitable. In preferred embodiments, the composition which is extruded as shell material preferably consists of the precursor material and the free-radical initiator and in further preferred embodiments the sum of precursor material and free-radical initiator amounts to at least 98 wt. %, ideally greater than 99 wt. % of the composition which is extruded as shell material. In further embodiments of the invention, the composition which is extruded as shell material consists of the precursor material, the free-radical initiator and an agent for improving interfacial compatibility.

The precursor material, which is at least one compound with two in each case terminal diacrylate groups and/or dimethacrylate groups which are linked by a rigid group, may in part be replaced by tri-, tetra- or more highly functional acrylates, in particular in order to adjust the viscosity of the precursor material, as mentioned above. The present invention thus also comprises embodiments in which the di(meth)acrylate precursor material is replaced in an amount of up to 30 wt. %, for example up to 25 wt. % or up to 20 wt. %, by such tri-, tetra- or more highly functional acrylates. One example of such a trifunctional acrylate which may be used is trimethylolpropane triacrylate (TMPTA).

As explained above, extrusion is carried out in a gas atmosphere, i.e. air, gas, in particular inert gas, in order to generate a maximum interfacial tension of the shell relative to the external medium, such that a sufficiently good, defect-free and in particular very smooth surface is obtained as a condition for a "pinhole"-free barrier. In addition to air, suitable gases or inert gases are for example nitrogen or noble gases such as argon. Droplet formation in air or a gas atmosphere results in the best possible surface quality with low roughness comparable with the substrates for barrier films, as has been demonstrated by AFM images. This is particularly favorable with regard to optional further upgrading and improvement of the barrier properties of the capsules, for example by subsequent metallization or metal oxide coating.

Droplet generation is assisted by vibration in the frequency range from 20 to 2000 Hz depending on capsule size. For a capsule size of 4 mm in diameter, the frequency range of 40 to 200 Hz is preferred, which is equivalent to a quantity of capsules of 40 to 200 capsules per second or approx. 150,000 to 720,000 capsules per hour. A process which can be scaled up and made commercially viable is consequently obtained.

Short exposure times are desired in order to produce capsules with barrier quality. A short, high intensity exposure pulse initiates curing of the shells which, after the following dark reaction, brings about very high conversion rates of the introduced monomers of for example distinctly above 90%, such that the curing reaction is very largely complete when the capsules hit the collecting tank or a collecting device and the capsules have a tack-free surface. The exposure time preferably amounts to approx. 0.02 to 0.2 seconds, particularly preferably to approx. 0.05 to 0.1 seconds. A maximum, hitherto unachieved or unreported degree of crosslinking is obtained as a result. The conversion rate is for example in the range from 93-95% for example for TCDD(M)A, but at least 85%.

The initiator reaction is initiated in a UV radiation field which is obtained from a mercury spectrum or metal-doped (e.g. Fe) mercury radiator. The radiators used may specifically be for example iron-doped mercury vapor radiators which generate a type D radiation spectrum. This is characterized in that it also has a strong output in the longer-wave UV range from 350 to 400 nm which extends beyond the short-wave Hg spectrum. A usable radiator is 15 cm long and each cm of length emits a maximum of 200 watts of total radiant power (IR, visible, UV). The radiation can be focused via an elliptical reflector into a focal line through which the capsules fall. Suitable radiant intensities which may mentioned overall are for example approx. 140 W per cm of arc length or approx. 50 to 140 W/cm$^2$ of intensity per unit area.

The composition which contains a UV-polymerizable precursor material also contains a free-radical initiator. Free-radical initiators which may be used are conventional commercial UV initiators known to a person skilled in the art, such as for example benzophenones, acylphosphine oxides, α-hydroxyketones or the like, in particular Lucirin® TPO (BASF) or Irgacure® 184 (Ciba).

After curing, the residual monomer content of the introduced monomers preferably amounts to 15 wt. % or less, more preferably 2 to 10 wt. % and still more preferably 1 to 5 wt. %. This corresponds to a high conversion rate, i.e. a high degree of conversion of the introduced monomers, and thus a minimized residual monomer content in the shell. At the same time, the required quantity of free-radical initiator is reduced. As a consequence, even in the case of extended storage, migration of residual monomers and initiator molecules into the core material may be reduced down to the range of the limit of detection. New levels of quality which also permit use of the materials in the consumer product field are thus achieved. It is moreover particularly advantageous that the high-intensity UV irradiation sterilizes the core material in situ and so disinfects it. The conversion rate and accordingly also the residual monomer content of the shells may straightforwardly be determined, for example, using the dynamic scanning calorimetry (DSC) method and used for quality assurance. To this end, a representative quantity (typically 0.1 g) of cured shell fragments is continuously heated in a crucible at a rate of 10 K/min, as a result of which the remaining double bonds are caused to react, and the remaining quantity of double bonds is quantified by evaluating the resultant exothermic signal.

In line with the low residual monomer content, the conversion rate may be distinctly greater than 85% and typically even distinctly greater than 90%.

Addition of a processing additive to the core material is provided in order to achieve interfacial compatibility between the preferably polar, predominantly aqueous core material and the distinctly less polar shell material. Such agents which are suitable for achieving interfacial compatibility are for example neutral surfactants (e.g. Tween 80) or water-soluble polymers such as polyethylene oxide with a molecular weight in the range from approx. 1,000 to 10,000,000, in particular 50,000 to 3,000,000 or 100,000 to 2,000,000 (e.g. PEO with molar mass of 1 million or 2 million dalton). Over and above its interfacially active action, the additive PEO has the additional advantage of increasing the viscosity of the core material, so reducing the vibration behavior of the droplet and thus favoring capsule formation with regard to sphericity.

The concentration is preferably in the range from approx. 0.05 to 2 wt. %, based on the core material. The composition which contains the UV-polymerizable precursor material may also have an agent for achieving interfacial compatibility added to it, for example an ethoxylated acrylate, but it is preferred according to the invention for the agents for achieving interfacial compatibility only to be added to the core material.

Due to the high degree of conversion achieved during curing, active post-curing need not be performed in some embodiments of the invention, but such post-curing, in particular UV curing, may be advantageous in order to reduce the residual monomer content further. If the produced capsules are not shielded from the scattered light from the radiator, for example in the collecting tank, automatic post-crosslinking takes place without any need for further action.

Even unmodified, the capsule walls of the capsules according to the invention or produced according to the invention have up to moderate barrier properties at shell thicknesses of the order of 150 μm. Water vapor transmission rates (WVTR) in the range from 1 to 10 g/m²d under standard measurement conditions (23° C., 80% relative humidity difference) are thus obtained. The water vapor transmission rate may be determined using a predetermined number of particles, typically 20 particles, of known wall thickness (e.g. approx. 150 μm single wall thickness) which are located in an environment with a relative humidity of 20%. Weight loss is then determined gravimetrically over a predetermined time interval of, for example, 2 weeks. The high degree of crosslinking is a substantial prerequisite for and/or favors the capsules' barrier properties.

The low WVTR of the unmodified capsules is a prerequisite for upgrading/improving the capsules into the high and ultra-high barrier range as it permits the process conditions necessary for the vacuum processes to be established. The capsules according to the invention or produced according to the invention are vacuum-resistant, i.e. mechanically sufficiently stable and sufficiently impermeable to water vapor, such that they can be further processed in vacuum processes without damage to the shell and in this way still further upgraded. These processes include the processes used as standard in barrier film technology such as vacuum coating by vapor deposition, sputtering, plasma processes and the like. Thanks to their stability and impermeability, the capsules can also be subjected to chemical and/or electrodeposition metallization.

The embodiments described as advantageous with regard to the method also explicitly apply mutatis mutandis to the capsules according to the invention or producible according to the invention. The capsules accordingly for example preferably have a WVTR (measured at 23° C. and a relative humidity difference of 80%) of 0.005 to 50 g/m²d, in particular of 0.1 to 10 g/m²d or 1 to 10 g/m²d.

As a result of the material selected and the high degree of crosslinking, the capsules according to the invention or produced according to the invention have a shell which undergoes brittle fracture, such that the water-containing core material is releasable by mechanical action, for example by exposure to pressure (for example an impact load) and/or shear stress.

In those cases in which release of the core material from the at least one capsule of the filter element according to the invention is intended to proceed in response to pressure, the wall thickness of the capsule may for example be in a ratio of single wall thickness to capsule diameter of for example 1:50 to 1:120.

FIGURES

FIG. 4 shows a second embodiment of a tobacco article according to the invention with a filter element according to the invention.

FIG. 5 shows a third embodiment of a tobacco article according to the invention with a filter element according to the invention.

EXAMPLES

Production of a Capsule with a Liquid Medium as Core Material for Use in a Filter Element According to the Invention The method according to the invention for producing water (vapor)-impermeable capsules is described in greater detail below, as is the use thereof in a filter element according to the invention or tobacco article.

Figure 1:
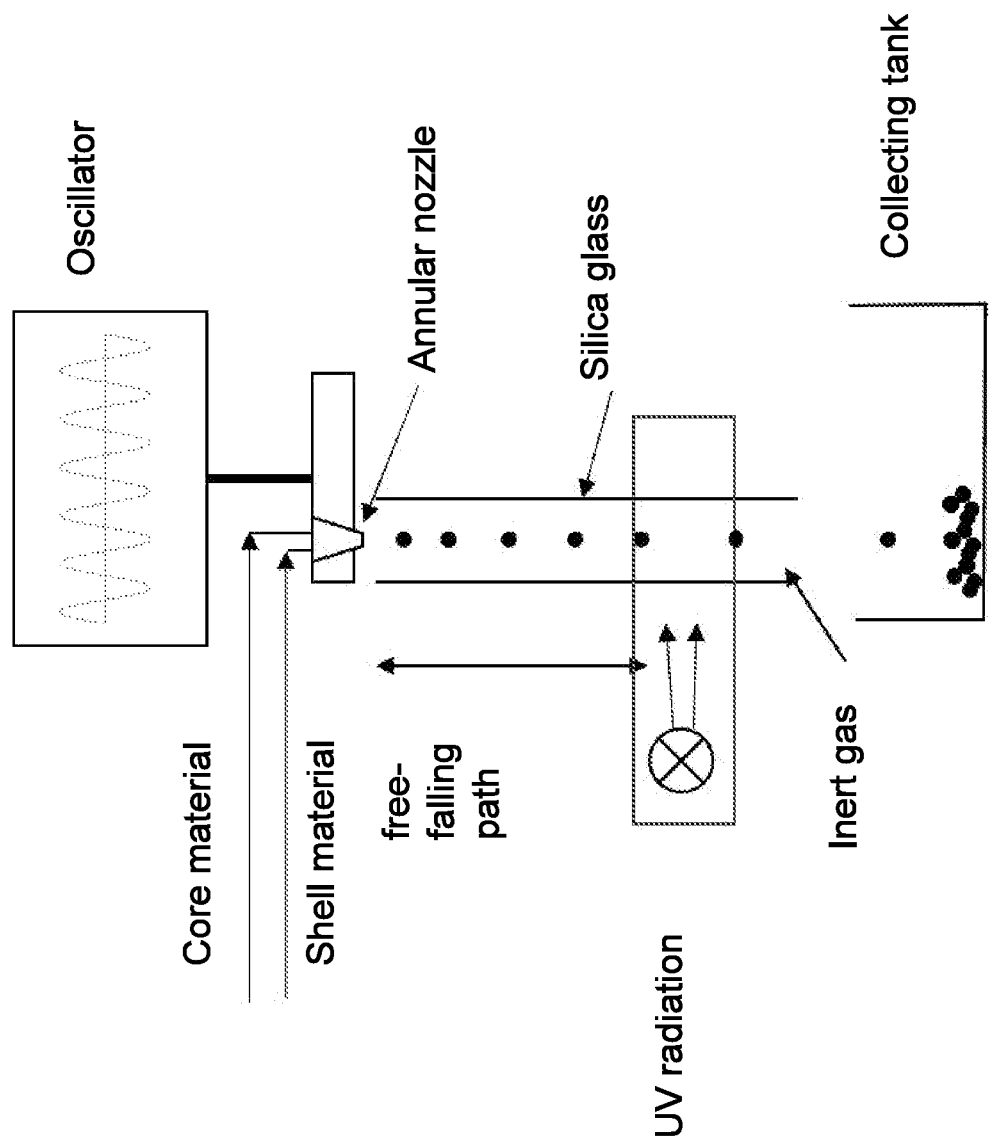
FIG. 1 is a schematic diagram showing the technical sequence of a method for producing suitable capsules for the filter element according to the invention.

The technical sequence of the crosslinking reaction (curing reaction) is shown by way of example in FIG. 1. As has already been mentioned, the capsules are produced by means of an annular nozzle with a preferably concentric inner nozzle. The water- and additive-containing core material to be encapsulated and the composition which contains the precursor material for the encapsulation material and the free-radical initiator are separately conveyed with the assistance of a suitable delivery device (e.g. by means of pumps or by pressurization) from the holding tanks into the nozzle structure. There is no specific limit to the diameter of the outer nozzle; it is typically in the range from approx. 5 mm to 0.1 mm, but may be a further order of magnitude smaller for obtaining still smaller capsules. The diameter of the inner nozzle is appropriately coordinated with the external diameter and is accordingly for example 2:3. Fine adjustment of the wall thicknesses of the capsules is, however, above all also determined by parameters other than those of nozzle geometry, for example by the selected delivery pressures which may favorably be in the range from 0.1 to 5 bar overpressure in comparison with ambient pressure. It is preferred for the holding tank and nozzle to be separately temperature-controllable. In this way, any relatively high viscosity resins as shell material can be adjusted to the desired viscosity range without (as a result of the transient thermal stress) any damage or unwanted side-effects occurring. Given suitable coordination of process parameters (e.g. a temperature in the range from approx. 5 to 50° C. and/or a delivery rate of approx. $10^4$ cm$^3$/min to approx. 10 cm$^3$/min for the resin and/or the content, depending on the desired size/thickness of the capsules and desired relationship between encapsulated material and wall thickness), it is possible to produce spheres consisting of the shell material with the core material in the interior. The diameter of the spheres is preferably in the range from 0.1 to 10 mm, more preferably 1 to 5 mm. It is principle possible according to the invention to establish a ratio of wall thickness to capsule diameter of 1:100. It is accordingly possible to produce stable capsules of for example 4 mm in diameter with a wall thickness of 40 μm.

The capsules of the core material enveloped with the precursor material composition are preferably not extruded into a liquid but instead, after leaving the nozzle, move generally in free fall towards a curing zone, i.e. are accelerated under the influence of gravitational force. The greater the distance between the nozzle and curing zone, the faster they fall through the curing zone and thus the shorter is the residence time. The distance should be selected such that individual capsules are formed: these usually leave the nozzle in droplet form and require a certain amount of time in order to form the desired (ideally spherical) geometry. The geometry of the device must take this into account because otherwise capsules with an uneven shell thickness are obtained which, in the most unfavorable case, have defects. A distance in the range from 10 to 50 cm has proved to be a favorable compromise. One or more diaphragms (in particular iris diaphragms) may be provided within this falling path in order to protect the nozzle from scattered light from the curing zone.

The contact time of the contents with the precursor material prior to curing generally amounts overall to only a short time interval (e.g. fractions of a second, in particular 0.1 to 0.5 sec), such that the risk of the contents being contaminated by dissolution of shell constituents is minimized.

The curing zone is a region of high radiant intensity which can be provided by commercially obtainable radiators such as UV radiators from Hoenle or Fusion. The length of the zone is in principle not defined; it favorably amounts to 15-60 cm. Droplet formation is conventionally vibration-induced with the assistance of a vibration device. A high-voltage electrostatic field between the annular nozzle and a counter-electrode below the collecting tank may be provided to assist droplet breakaway.

According to the invention, the residence time of the capsules in the curing zone amounts, depending on the length of the curing zone and the nozzle-curing zone distance, to between approx. 0.05 and 0.2 seconds, preferably approx. 0.05 to 0.1 seconds. In particular, a residence time of approx. 0.06 seconds as a typical residence time is obtained at a curing zone length, in particular a radiator length of 15 cm and a nozzle-radiator distance (which preferably amounts to approx. 10-30 cm) of approx. 20 cm. If inhibition by atmospheric oxygen is observed, the radiation field may optionally be flushed with inert gas. In the case of particularly thick shells, the capsules may, if required, also be post-cured to ensure complete curing by locating the collecting vessel in the scattered line zone of the radiator.

As stated, curing proceeds with the assistance of actinic radiation. Exposure of the contents to high temperatures is largely avoided as a consequence (cold curing).

If capsule formation proceeds without active droplet shearing, i.e. if the capsule is detached from the nozzle only under the effect of the droplets' weight force, droplet size is primarily determined by the surface and interfacial characteristics of the content and of the capsule material and only to a subordinate extent by nozzle geometry. Capsules typically of a diameter of 0.5 to 5 mm are obtained by addition of substances which reduce surface and interfacial tension (e.g. surfactants). Shearing and thus breakaway of the droplets in order to achieve smaller diameters or to achieve a higher throughput may optionally be assisted by a special nozzle configuration, a directional gas stream, by oscillation (vibration), electrostatic fields or other mechanisms known in specialist circles. In the case of "laminar jet breakup", in which droplet formation proceeds with vibration assistance, capsule geometry is directly determined by nozzle dimensions.

One suitable approach to upscaling is to parallelize the method with the assistance of multiple nozzles.

The radiation field should be illuminated differently depending whether an individual or parallel mode of operation is used. In the case of an individual or monomodal mode of operation, it is favorable to use an ellipsoidal reflector or the like to focus the radiant intensity into a focal line through which the capsules fall. In the case of a multimodal mode of operation, a parabolic reflector geometry which ensures uniform illumination of the radiation field may be advantageous.

Example of Application 1

Production of capsules with a diameter of 4 mm based on Sartomer® SR 833 S (Arkema) (tricyclodecanedimethanol diacrylate)

Core material preparation: 0.5 g of PEO (2 million) was dissolved with stirring at 30° C. in 100 ml of demineralized water which had previously been boiled (to remove dissolved oxygen).

Shell preparation: 0.25 g of Lucirin® TPO was stirred into 25 g of SR 833 S and dissolved at 50° C. under an argon atmosphere with shielding from light.

The two materials were transferred into the corresponding holding tanks for core and shell. Both tanks were adjusted to 25° C.

The falling path was flooded with argon as inert gas. The UV radiator was set to 60% of maximum power, corresponding to a radiant intensity of 84 W/cm. The frequency of the vibration generator was set to 60 Hz. Delivery pressures were set to 100 mbar (core) and 400 mbar (shell) and extrusion through a concentric nozzle configuration consisting of annular nozzle (with a diameter of 3.1 mm) with a concentric cannula (2.2 mm bore) was begun. Droplet formation was checked stroboscopically. Curing of the capsules as they formed proceeded in free fall and the capsules were collected in a container (beaker). Capsules of a uniform size (4 mm external diameter) and an average shell thickness of approx. 145 μm were obtained. The capsules remained in the scattered light from the radiator for approx. 5 minutes and were consequently post-cured.

Permeation (water (vapor) permeability) was determined gravimetrically on the basis of the weight loss over time of a capsule sample consisting of 20 capsules on storage at 23° C. and 20% rel. humidity. Monitoring of weight loss over a period 2 weeks reveals water vapor permeation of 2.7 g/m²d for a shell thickness of 150 µm.

A conversion rate of 93% was determined from DSC measurements.

Example of Application 2

Production of capsules with a diameter of 4 mm based on Sartomer® SR 833 S with a reduced wall thickness Core material preparation: 0.6 g of TWEEN 80 was dissolved in 100 ml of previously boiled demineralized water.

Shell preparation: 0.4 g of Irgacure® 184 was stirred into 20 g of SR 833 S and dissolved at 50° C. under an argon atmosphere with shielding from light. The two materials were transferred into the holding tanks for core and shell. Both tanks were adjusted to 25° C.

The falling path was flooded with argon as inert gas. The UV radiator was set to 70% of maximum power, corresponding to a radiant intensity of 98 W/cm. The frequency of the vibration generator was set to 60 Hz. Delivery pressures were set to 50 mbar (core) and 400 mbar (shell) and extrusion through a concentric nozzle configuration consisting of annular nozzle (with diameter of 3.1 mm) with a concentric cannula (2.2 mm bore) was begun. Droplet formation was checked stroboscopically. Curing of the capsules as they formed proceeded in free fall and the capsules were collected in a container (beaker). Capsules of a uniform size (4 mm external diameter) and an average shell thickness of approx. 120 µm were obtained. Post-curing in scattered light.

Example of Application 3

Production of capsules with reduced diameter (2.4 mm) based on shell material consisting of the combination UDMA:TMPTA (trimethylolpropane triacrylate)=3:1 with a shell thickness comparable to Example 2.

Core material preparation: 0.5 g of PEO (2 million) was dissolved in 100 ml of water.

Shell preparation: 0.4 g of Lucirin® TPO was stirred into 33 g of the UDMA:TMPTA acrylate combination=3:1 and dissolved at 50° C. with shielding from light. The two materials were transferred into the holding tanks for core and shell. The holding tank for the shell material and the nozzle were adjusted to 50° C. and the tank for the core material to 25° C.

The falling path was flooded with argon as inert gas. The UV radiator was set to 60% of maximum power, corresponding to a radiant intensity of 84 W/cm. The frequency of the vibration generator was to at 90 Hz. Delivery pressures were set to 200 mbar (core) and 4300 mbar (shell) and extrusion through a concentric nozzle configuration consisting of annular nozzle (with a diameter of 1.75 mm) with a concentric cannula (1.1 mm bore) was begun. Droplet formation was checked stroboscopically. Curing of the capsules as they formed proceeded in free fall and the capsules were collected in a container (beaker). Capsules of a uniform size (2.4 mm external diameter) and an average shell thickness of approx. 110 µm were obtained.

Investigation of the Storage Life of the Capsules Produced by the Described Method:

In the investigation, a known number of capsules were stored in a conditioning cabinet under defined climatic conditions (22° C., 60% rel. humidity). Weight loss over time was determined by regular weighing. The only possible cause for weight loss is the evaporation of water. Evaluation took account of the weight of the capsule shell.

Conversion of the losses into WVTR revealed a value of 1.06 g/m²/day.

The observation period was 42 days.

It was possible to demonstrate that the capsules according to the invention are distinguished by particularly low water loss. Water loss after 42 days was accordingly less than 10 wt. % based on the original total weight of the filled capsules at the start of the experiment.

Figure 2:
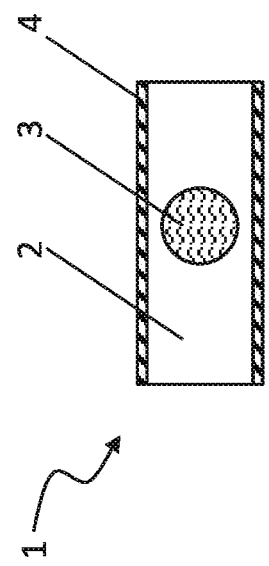
FIG. 2 is a schematic diagram showing a filter element according to the invention for use in a tobacco article.

Exemplary Embodiments of the Filter Element According to the Invention or the Tobacco Article According to the Invention FIG. 2 shows an embodiment of filter element 1 according to the invention. The filter element 1 comprises a filter body 2 and a capsule 3 which is embedded in the filter body 2 and is filled with a liquid medium as core material. The combination of filter body 2 and capsule 3 is surrounded by a shell material 4 which defines the outer edge of the filter element 1.

Figure 3:
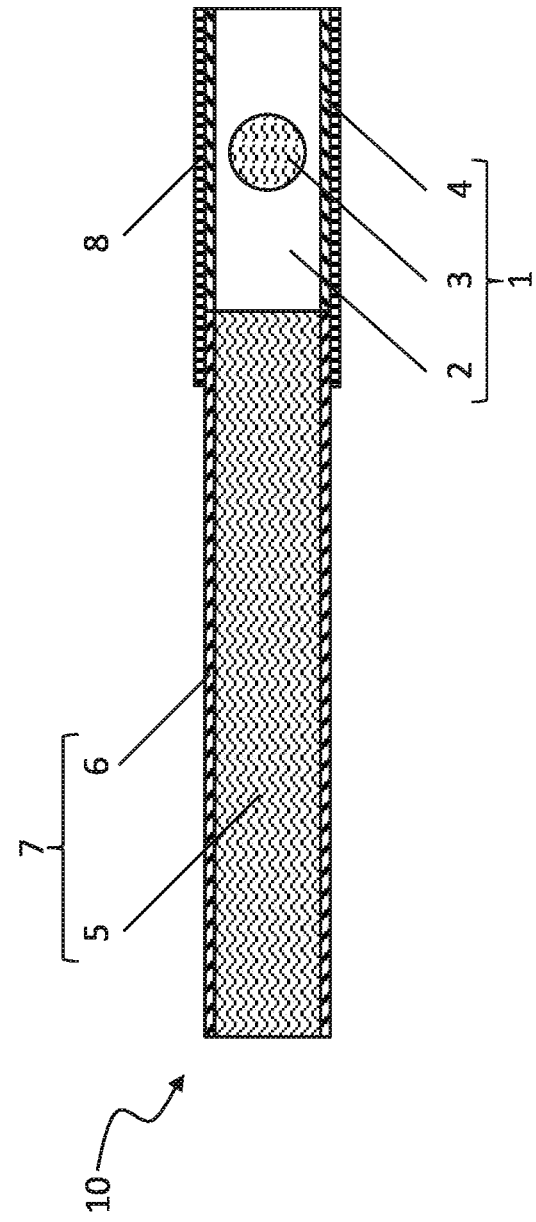
FIG. 3 shows a first embodiment of a tobacco article according to the invention with a filter element according to the invention.
Figure 6:
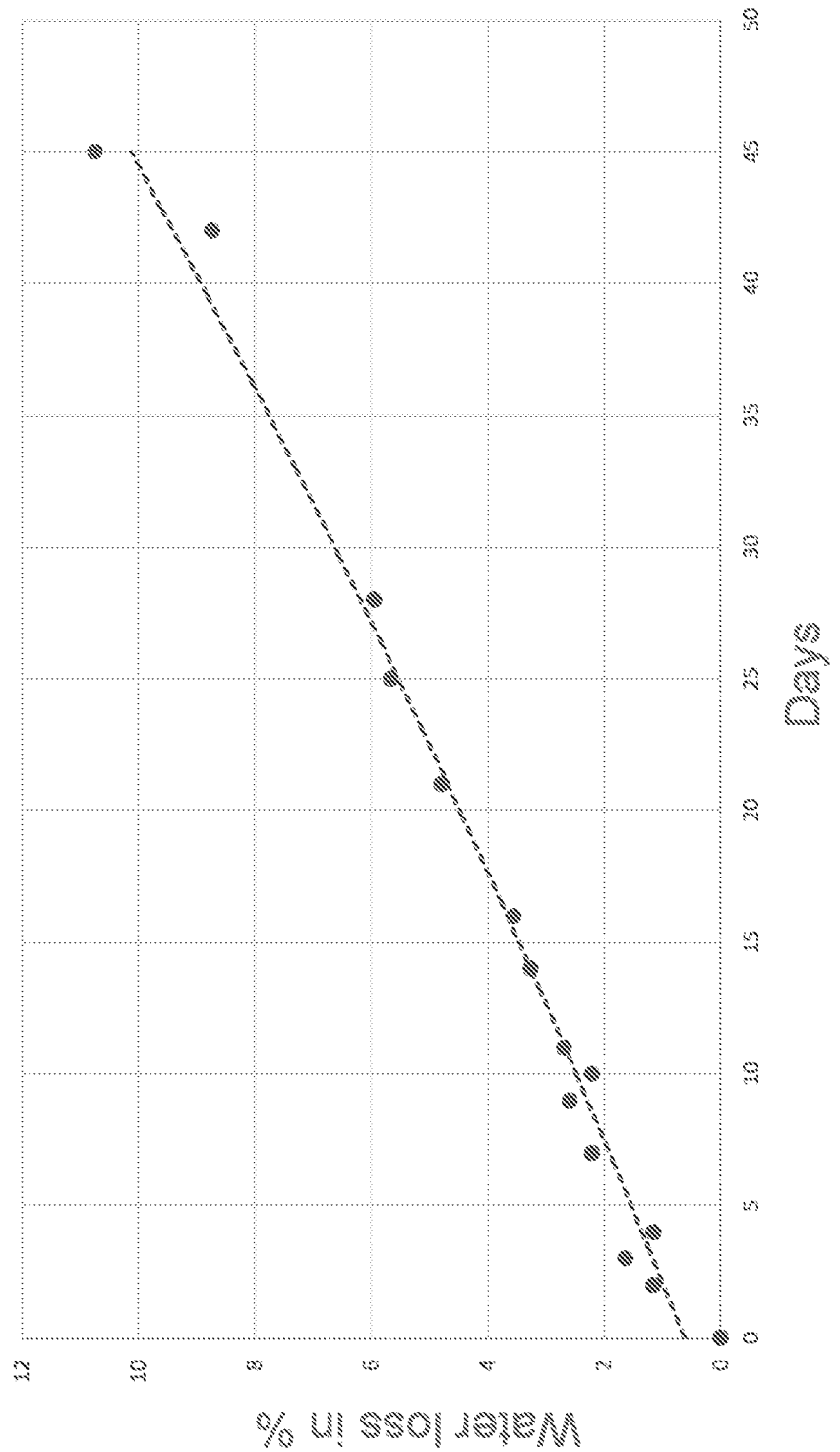
FIG. 6 shows the results of an investigation of the storage life of the capsules produced by the described method.

FIG. 3 shows a first embodiment of the tobacco article 10 according to the invention, wherein the tobacco article 10 includes the filter element 1 according to the invention of FIG. 2. The tobacco article comprises a tobacco-containing, rod-shaped element 7 which comprises a tobacco-containing material 5 which is surrounded by a shell material 6. The tobacco-containing, rod-shaped element 7 is connected to the filter element 1 by a retaining element 8, wherein the retaining element 8 (known as "tipping paper") is manufactured from paper or paper-containing material. The retaining element 8 connects the tobacco-containing, rod-shaped element 7 to a filter element 1, as shown in FIG. 2, and ensures that these two components remain in their spatial arrangement to one another.

FIG. 4 shows a second embodiment of a tobacco article 10 according to the invention, wherein the tobacco article 10 of FIG. 4 differs from the tobacco article of FIG. 3 merely in the embodiment of the filter element 1 according to the invention. In contrast with the filter element 1 of the tobacco article 10 of FIG. 3, the capsule in the filter element 1 of the tobacco article 10 of FIG. 4 is not embedded in the at least one filter body 2 but is instead arranged is between the two filter bodies 2 and 9.

FIG. 5 shows a third embodiment of a tobacco article 10 according to the invention, wherein the tobacco article 10 of FIG. 5 differs from the tobacco article of FIG. 4 merely in the embodiment of the filter element 1 according to the invention. In contrast with the filter element 1 of the tobacco article 10 of FIG. 4, the filter body 9 has a hollow recess. The tobacco article 10 according to FIG. 5 thus has a recess at the mouth end of the filter element 1 and is thus a tobacco article 10 with a "recess filter".

The invention claimed is:

1. A filter element for use in a tobacco article, the filter element having at least one filter body and at least one capsule with a liquid medium as core material:
   wherein the at least one capsule has a water vapor-impermeable shell of a polymeric material that encircles the core material and which was obtained from a UV-polymerizable precursor material;

wherein the UV-polymerizable precursor material is at least one compound having two terminal diacrylate and/or dimethacrylate groups which are linked by a rigid, non-polar, non-crosslinking group and having a free-radical initiator;

wherein the at least one capsule is produced by passing the UV-polymerizable precursor material encircling the core material through a curing zone while applying UV radiation thereto for a time period in a range from 0.02 to 0.2 seconds, the UV radiation being applied at a sufficient intensity over the time period so that the shell of the at least one capsule is formed having a residual monomer content in a range from 2 to 10 wt. % and a water vapor transmission rate (WVTR) (measured at 23° C. and a relative humidity of 80%) in a range from 0.1 to 10 g/m²d; and wherein the at least one capsule has a diameter in a range from 0.1 to 10 mm and a wall thickness in a range from 10 μm to 2 mm.

2. The filter element according claim 1, wherein the liquid medium of core material is releasable by mechanical loading.

3. The filter element according to claim 1, wherein the rigid group of the UV-polymerizable precursor material comprises or is derived from at least one compound which is selected from the group consisting of:
  a. aliphatic bicyclic or tricyclic ring diol systems which may be substituted by alkyl groups with 1 to 3 carbon atoms;
  b. bisphenol A or derivatives thereof in which one or both phenyl residues are substituted by alkyl groups with 1 to 3 carbon atoms; and
  c. diurethanes which are formed from a branched $C_5$ to $C_{10}$ alkyl diisocyanate or $C_5$ to $C_{10}$ cycloalkyl diisocyanate and monoethylene glycol.

4. The filter element according to claim 1, wherein the UV-polymerizable precursor material is selected from bisphenol A diacrylate, bisphenol A dimethacrylate, tricyclodecanedimethanol diacrylate, tricyclodecanedimethanol dimethacrylate and/or urethane dimethacrylate (UDMA) of the following formula, this generally being an isomer mixture:

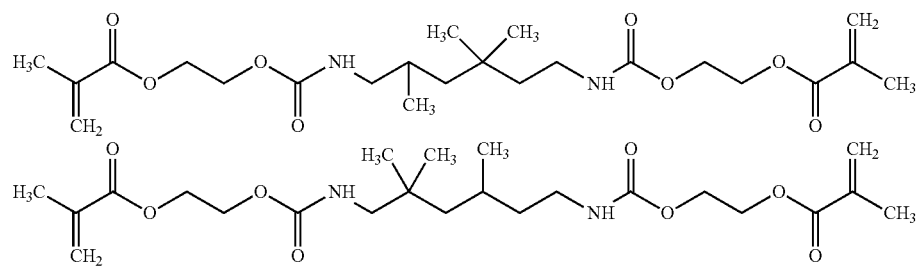

5. The filter element according to claim 1, wherein the UV-polymerizable precursor material has a viscosity of 0.001 to 50 Pa·s.

6. The filter element according to claim 1, wherein the UV-polymerizable precursor material contains no solvent and no substances which are readily volatile at room temperature and atmospheric pressure.

7. The filter element according to claim 1, wherein the liquid medium is a hydrophilic liquid medium.

8. The filter element according to claim 1, wherein the liquid medium of the core material contains salts, salt hydrates, carbohydrates, proteins, vitamins, amino acids, nucleic acids, lipids, medicines, thickeners, emulsifiers, surfactants, colorants, cell material, aroma substances, fragrances or other active ingredients.

9. The filter element according to claim 1, wherein the capsule has an additional coating on the outside.

10. The filter element according to claim 1, wherein the capsule is embedded in the at least one filter element.

11. The filter element according to claim 1, wherein the capsule is arranged next to the at least one filter body.

12. The filter element according to claim 1, wherein the filter element has more than one filter body.

13. The filter element according to claim 1, wherein the filter element has at least one filter body which has one or more hollow recesses in the longitudinal direction.

14. The filter element according to claim 1, wherein the at least one capsule has a compressive strength in the range from 5 N to 25 N.

15. The filter element according to claim 1, wherein the at least one filter body and the at least one capsule are surrounded by a shell material, the shell material being paper or paperboard.

16. A tobacco article containing a tobacco-containing, rod-shaped element and filter element according to claim 1, which is arranged in the axial direction thereto.

17. The filter element according to claim 1, wherein the at least one capsule has a diameter in a range from 1 to 5 mm.

18. The filter element according to claim 1, wherein the at least one capsule has a wall thickness in a range from 50 μm to 200 μm.

19. The filter element according to claim 1, wherein the UV-polymerizable precursor material has a viscosity of 0.1 to 10 Pa·s.

20. The filter element according to claim 1, wherein the liquid medium is an aqueous solution or dispersion.

21. The filter element according to claim 1, wherein the at least one capsule has an additional coating on the outside, with the coating being obtained by means of vacuum processes such as sputtering, vapor deposition or plasma processes, or by means of chemical or electrodeposition coating, in order to obtain coated capsules.

22. The filter element according to claim 1, wherein the filter element has more than one filter body, the at least one capsule being arranged between two adjacent filter bodies.

23. The filter element according to claim 1, wherein the curing zone is filled with an inert gas while the UV-polymerizable precursor material encircling the core material is passed therethrough and while applying the UV radiation to the UV-polymerizable precursor material encircling the core material.

24. The filter element according to claim 1, wherein the time period is in a range from 0.05 to 0.1 seconds.

* * * * *